Patented July 13, 1954

2,683,743

UNITED STATES PATENT OFFICE 2,683,743

METHOD OF PREPARING AMINO-KETONES AND REDUCTION PRODUCTS THEREOF

Hendrik Durk Moed, Weesp, Netherlands, and Meier Asscher, Post Roshpinah, Israel, assignors to Hartford National Bank and Trust Company, Hartford, Conn., as trustee No Drawing. Application April 11, 1950, Serial No. 155,342

Claims priority, application Netherlands April 13, 1949

8 Claims. (Cl. 260—570.5)

The invention relates to a method of preparing aminoketones and reduction products thereof and particularly to compounds of that type having physiological or sympatomimetic activity.

Compounds of the type

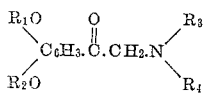  (I)

where $R_1$ and $R_2$ represent aralkyl or alkyl groups and $R_3$ and $R_4$ represent hydrogen, alkyl or aralkyl groups or which jointly with the nitrogen atom form a ring can be prepared by reacting a ω-halogen acetophenone, disubstituted in the benzene nucleus, of the type

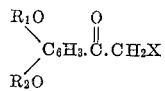  (II)

where X represents a halogen atom, with the corresponding amine. The ketones thus produced are adapted to be converted into secondary alcohols by reduction. Most examined ketones and alcohols of the said type have a more or less marked physiological and more particularly sympatomimetic activity. Well-known in this respect is, for example, adrenaline synthetized in the aforesaid manner by reaction of dihydroxy-3',4'-ω-chloroacetophenone with methylamine, followed by reduction of the produced ketone, the adrenalone (cf. Karrer, Organic Chemistry, 1949, page 446). In this reaction, however, the yield of aminoketone, with respect to the diphenol from which the dihydroxy-3'4' ω-chloroacetophenone has been obtained, is comparatively small. This limitation generally applies to reactions of this kind.

It is accordingly an object of the invention to provide a method of preparing an aminoketone with improved yield and having other desirable advantages.

According to the invention, a compound selected from the group consisting of

and

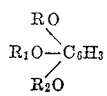

where $R$, $R_1$ and $R_2$ represent alkyl or aralkyl groups, is caused to react either with a compound

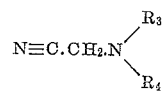

where $R_3$ and $R_4$ represent hydrogen, alkyl or aralkyl or which form a ring with the adjacent nitrogen atom, or with a salt of the aforementioned compound of a strong inorganic acid.

In this reaction a salt is formed of an imide:

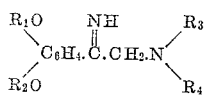

which can be converted, by the action of water, into an aminoketone

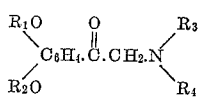

or a salt thereof.

If desired, the groups $R_1O$ and $R_2O$ or either of them may subsequently be converted into OH-groups, or the CO-group may be reduced to a CHOH-group. Alternatively these measures may be combined.

Consequently, the invention is based on an extension of the known synthesis of acetophenones substituted in the benzene nucleus according to Houben-Hoesch method (cf. V. Migrdichian, The Chemistry of Organic Cyanogen Compounds, 1947, page 236) with the understanding that we do not start with nitriles but with aminonitriles, if desired substituted in the amino group by alkyl and/or aralkyl groups. Migrdichian states, furthermore, that the solvent has a great influence on the rapidity of the reactions there described and mentions ether in this respect as the most suitable solvent. Thus, for example, the combination of zinc chloride-, ether-hydrochloric acid gas in the conversion of acetonitriles yields satisfactory results according to Houben-Hoesch (Migrdichian, Houben and Fischer, "Journal der praktischen Chemie" (2) 123, 89 (1929) and Ber. 60, 1759 (1927)). Migrdichian (page 237) furthermore describes the condensation of resorcinol with hippurylcyanide according to the Houben-Hoesch method, this condensation also being carried out with the use of ether as a solvent in the presence of zinc chloride and with the introduction of hydrochloric acid gas. Under these conditions however, amino-acetonitriles cannot be converted in a corresponding manner.

In accordance with the invention the condensation is carried out in a solvent having a marked polarity which does not partake itself in the reaction, such as nitrobenzene, ortho-nitrotoluence and ortho-nitroanisol. Use is preferably made of nitrobenzene as a solvent.

As stated previously, the method according to the invention may be employed for the conversion of compounds of the type

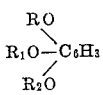

where R, similarly to $R_1$ and $R_2$ represent alkyl or aralkyl with amino-acetonitriles, leading to the formation of compounds of the type

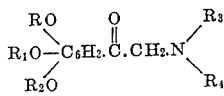

which also comprise substances having a physiological activity.

It has been found that the phenols of the types

and

with the exception of resorcinol, cannot be converted with amino-acetonitriles by the method according to the invention. If desired, after condensation, the other groups of the condensation product or part of these ether groups may again be converted into phenolic hydroxyl groups, the CO-groups being reduced to a CHOH-group.

Important substances, for example, which can be prepared by the method according to the invention are, in addition to adrenalin, the (dihydroxy-3'4' phenyl)-isopropylamino-2 ethanol-1

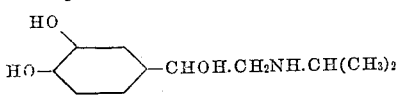

and the (dihydroxy-3'4'-phenyl)-amino-2-ethanol-1

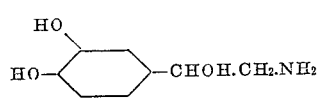

The two substances are known for their physiological activity. They are derived from pyrocatechol and may be obtained, according to the invention, from a compound of the type

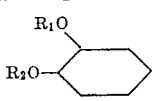

where $R_1$ and $R_2$ represent alkyl- or aralkyl groups. These compounds are caused to react with the desired amino-acetonitrile, or the hydrochloride thereof, whereupon the produced di-ether is finally again converted into the corresponding di-phenol and the produced ketone is reduced to a secondary alcohol.

The duration of the reaction in the method according to the invention may vary from a few hours to a few days. The reaction temperature lies preferably between 0 and 70° C. As a salt of the aminonitrile use is preferably made of hydrochloride. When using readily fissible ethers, it may happen, during condensation, that one or more ether groups are converted into a phenol group or phenol groups. If, in the amino ketones, non-substituted or substituted benzyl groups limited to the nitrogen atom or phenolic oxygen atoms occur, these groups are adapted to be converted, upon reduction of the amino ketones to amino alcohols, into hydrogen atoms.

The reduction of the ketones to secondary alcohols may be effected in a known manner, for example, by catalytic hydrogenation, usually with nickel, palladium or platinum as a catalyser.

The invention will now be explained in greater detail with reference to the following examples illustrating several embodiments of which the invention is capable.

Example I 46 gms. of anhydrous aluminum chloride are dissolved in 91 gms. of nitrobenzene and cooled down to a temperature between 20° and 30° C. Subsequently, 16.8 gms. of methylamino-acetonitril-hydrochloride (0.153 mol) and 44 gms. of dibenzylether of pyrocatechol (0.153 mol) are added, while stirring and cooling (temperature between 20 and 30°). Stirring is continued for six hours, while introducing hydrochloric acid gas. After that the reaction mass is poured out into water, the nitrobenzene layer is separated and the water layer is shaken up with ether. Nitrobenzol and the etheric solution are combined and the ether is evaporated. The residue contains part of the dibenzylether, which may be recovered by vapour distillation, nitrobenzol distilling over and the dibenzylether being left, which is purified by crystallisation from alcohol. Upon evaporation in vacuo, a tough yellow mass is formed in the water layer which deposits on the wall of the reaction vessel. If, after decanting the aforesaid solution, the mass is dissolved in alcohol and the water is removed by distillation with benzene the hydrochloride of the monobenzylether of adremalone crystallises out upon cooling. This is followed by drawing off, washing with acetone and drying. This substance has a melting point of 224° to 228° C. (while decomposing). The substance is purified by crystallisation from alcohol. After two crystallisations from alcohol, the substance is pure and has a melting point of 233° to 235° C. (while decomposing).

*Analysis.*—$C_{16}H_{18}O_3NCl$ (307.51): calculated C, 62.47; calculated H, 5.86; found C, 62.50; found H, 6.01; calculated N, 4.55; calculated Cl, 11.53; found N, 4.68; found Cl, 11.38.

Example II 120 gms. of anhydrous aluminum chloride were dissolved in 240 gms. nitrobenzene. After cooling down to room temperature, 44 gms. of (0.4 mol) methylaminoacetonitrilhydrochloride and 56 gms. (0.4 mol) of veratrole (O-dimethoxy-benzene) were added to this solution while stirring. Reaction temperature was maintained between 20 and 30° C. While stirring, dry hydrochloric acid gas was subsequently introduced for 6 hours, the temperature being maintained between 20° and 30°. The next day, the reaction mixture was poured out into 240 ccs. water and the nitrobenzene was removed by vapour distillation. The aqueous solution was then evaporated to dryness and the residue was evaporated three times with a mixture of alcohol and benzene and the solid mass was recrystallized from alcohol. 78 gms. of the product were thus obtained. After one further crystallisation from alcohol, the hydrochloride of 3,4-dimethoxy-ω-methylamino-acetophenone is obtained in pure form having a melting point between 239° to 240° C. (while decomposing).

*Analysis.*—$C_{11}H_{16}O_3NCl$ (245.387): found C, 53.65; found, H, 6.44; calculated C, 53.78; calculated H, 6.53; found N, 5.93; found Cl, 14.54; calculated N, 5.71; calculated Cl, 14.43.

Example III 60 gms. of anhydrous aluminum chloride were dissolved, while stirring in 120 gms. of nitrobenzene. While stirring 27 gms. of N-isopropyl-amino-acetonitrile-hydrochloride (0.2 mol) and 28 gms. (0.2 mol) of veratrole were added (temperature between 20° and 30° C.). Stirring was continued for 6 hours while introducing dry hydrochloric acid gas. Subsequently the reaction mixture was poured out into water, the nitrobenzene layer was separated and washed with water. The aqueous solutions were combined and evaporated in vacuo until crystallisation occurred followed by cooling. The solid substance was drawn off and crystallized from alcohol. The yield of raw was 45 gms. After one crystallisation from alcohol, the hydrochloride of 3.4-dimethoxy-ω-isopropylamino-acetophenone is pure. The yield of pure product was 36% to 65% of the theoretical value.

*Analysis.*—$C_{13}H_{20}O_3NCl$ (273.501); found C, 56.88; found H, 7.38; calculated C, 57.06; calculated H, 7.32; found N, 5.38; found Cl, 13.04; calculated N, 5.12; calculated Cl, 12.94.

Example IV

To a solution of 50 gms. of aluminum chloride in 120 gms. of nitrobenzene were added 19 gms. amino-acetonitrile-hydrochloride and 27.6 gms. (0.2 mol) of veratrole. The temperature remained below 30° C. Subsequently dry hydrochloric acid gas was introduced for six hours, while stirring vigorously and cooling with ice water. The reaction temperature was maintained between 20° and 30° C. The next day the reaction mixture as poured out into 500 ccs. of water, the water layer was removed and decoloured by means of carbon. The solution was evaporated to dryness in vacuo and the residue was freed of water by distillation with a mixture of alcohol and benzene. The solid substance was dissolved in 2 litres of boiling absolute alcohol. On cooling, the hydrochloride of 3.4-dimethoxy-ω-amino-acetophenone crystallized out. Output was 30 gms. or 65% of theoretical yield. The substance had a melting point of 219° (while decomposing). The hydrochloride is purified by crystallisation from alcohol. Melting point of the pure compound 220° C. (while decomposing). Mannich and Hahn (Ber. 44.1549) state a melting point of 221° C.

*Analysis.*—$C_{10}H_{14}NO_3Cl$ (231.483): found C, 51.00; found H, 6.15; calculated C, 51.86; calculated H, 6.06; found Cl, 15.30; calculated Cl, 15.33.

Example V 60 gms. anhydrous aluminum chloride were dissolved in 120 gms. of nitrobenzene. While stirring and cooling, 22 gms. (0.2 mol) of methylamino-acetonitrile-hydrochloride and 28 gms. (0.2 mol) 1.3-dimethoxy-benzene were added, the temperature remaining below 30° C. A homogeneous, dark green liquid is obtained. While cooling (reaction temperature 20° to 30° C.) and stirring dry hydrochloric acid gas was introduced for 6 hours, and the reaction mixture set aside over night. After that, the reaction mass was poured out into 1 litre water; the nitrobenzene layer was separated, washed with water and the aqueous solution was warmed on a water bath. After warming for one hour, the solution was decolored by means of carbon, filtered and the filtrate was concentrated by evaporation until crystallisation ensued. The crystallized product was nearly pure hydrochloride of 2.4-dimethoxy-ω-methylamino-acetophenone, weighed 25 gms., its percentage of chlorine being 14.95% (theoretical value 14.43%), and had a melting point of 200° to 201°. By adding Seignette salt, ammoniation, shaking up with ether, and acidification of the etheric solution with alcohol hydrochloric acid, a further quantity of 5 gms. of hydrochloride may be obtained from the mother lye. The total yield is 30 gms. or 61%. The salt is purified by crystallisation from alcohol. The pure compound melts at 203° to 204° C. (while decomposing).

*Analysis.*—$C_{11}H_{16}O_3NCl$ (245.498): found C, 53.83; found H, 6.57; calculated C, 53.78; calculated H, 6.53; found N, 5.92; found Cl, 14.50; calculated N, 5.71; calculated Cl, 14.43.

Example VI 60 gms. of anhydrous $AlCl_3$ were dissolved in 120 gms. of nitrobenzene. After cooling to a temperature below 30° C., 22 gms. (0.2 mol) of methylamino-acetonitrile-hydrochloride and 28 gms. (0.2 mol) of dimethylether of hydroquinone were added while stirring. While stirring and cooling (reaction temperature between 20° and 30°) dry hydrochloric acid gas was introduced for 6 hours and then the reaction mixture was poured out into a large quantity of water. The nitrobenzene layer was separated and the aqueous solution concentrated, by evaporation, to a small volume. The solution was made ammoniacal and Seignette salt was added until no further aluminum hydroxide precipitated. Subsequently the solution was repeatedly shaken up with ether; the etheric solution concentrated, by evaporation, to a small volume and hydrochloric acid gas was introduced into the residue. The precipitate turned crystalline after stirring with acetone. The hydrochloride of 2.5 dimethoxy-ω-methylamino-acethophenone is purified by crystallisation from alcohol and has a melting point of 172 to 173° C. (while decomposing).

*Analysis.*—$C_{11}H_{16}O_3NCl$ (245.489): found C, 53.73; found H, 6.59; calculated C, 53.78; calculated H, 6.53; found N, 5.80; found Cl, 14.78; calculated N, 5.71; calculated Cl, 14.43; found Cl, 14.52.

Example VII 60 gms. of anhydrous aluminum chloride were dissolved in 240 gms. of O-nitro-toluene. While stirring and cooling 22 gms. of (0.2 mol) methylamino-acetonitrile-hydrochloride and 28 gms. of (0.2 mol) veratrole were added. While stirring and cooling (reaction temperature 20° to 30° C.) hydrochloric acid gas was subsequently introduced for six hours. After that the reaction mixture was poured out into 500 ccs. water, the O-nitro-toluene and the water layer were separated and the aqueous solution was evaporated to dryness in vacuo. The residue was recrystallized from alcohol yielding 23 gms. of pure hydrochloride of adrenalondimethylether having a melting point of 239° to 240° C. (while decomposing).

Example VIII 60 gms. of anhydrous aluminum chloride were dissolved in 120 gms. of O-nitroanisol. While stirring and cooling, 22 gms. of methylamino-acetonitrile-hydrochloride and 28 gms. of (0.2 mol) veratrole were added. While stirring and cooling, dry hydrochloric acid gas was subsequently introduced for six hours. Reaction temperature was maintained between 20° and 30° C. After that the reaction mixture was poured out into 500 ccs. The water and the O-nitroanisol layers were separated and the water layer decolored by means of carbon, filtered out and concentrated, by evaporation, to a small volume in vacuo. The precipitate, the hydrochloride of 3.4-dimethoxy-ω-methylamino-acetophenone was drawn off and purified by crystallisation from alcohol.

Example IX 60 gms. of anhydrous aluminum chloride were dissolved in 120 gms. of nitrobenzene. After cooling, 22 gms. of (0.2 mol) hydrochloride of ω-methylamino-acetonitrile and 34 gms. of (0.2 mol) 1.2.3 - trimethoxy - benzene were added, while stirring, the temperature being maintained below 30° C. While stirring, dry hydrochloric acid gas was introduced for 6 hours and then the reaction mixture was poured out into 1 litre water. The nitrobenzene was separated and washed with water. The combined aqueous solutions were decolored with carbon and concentrated by evaporation, to a small volume. Subsequently a quantity of Seignette salt was added such that upon ammoniation no further aluminum hydroxide precipitates, the ammoniated solution being shaken up with ether. The etheric solution was concentrated by evaporation to a small volume, the residue freed from ammonia was again dissolved in ether and alcoholic hydrochloric acid was added. After distilling off the ether, the oil formed became solid on treating it with acetone. The solid mass was drawn off. The yield was 20 gms., the percentage of chlorine of the substance being 13.72% for the hydrochloride of 2.3.4 - trimethoxy-ω-methylamino-acetophenone a chlorine percentage of 12.79% is calculated. The hydrochloride was purified by crystallisation from alcohol, yielding 17 gms. of pure product.

*Analysis.*—$C_{12}H_{18}O_4NCl(275.590)$: found C, 51.66; found H, 6.66; calculated C, 52.27; calculated H, 6.54; found N, 5.30; found Cl, 12.91; calculated N, 5.08; calculated Cl, 12.89.

Example X

To a solution of 60 gms. anhydrous $AlCl_3$ in 120 gms. of nitrobenzene were added 22 gms. of hydrochloride of methylamino-acetonitrile at a temperature below 30° C. and, after cooling to 5° C., a solution of 34 gms. of 1.3.5-trimethoxy-benzene (0.2 mol) in 30 gms. of nitrobenzene. The soltuion turned dark. Subsequently, dry hydrochloric acid gas was introduced for six hours while stirring and cooling, the reaction temperature being approximately 5° C. The next day the reaction mixture was poured out on ice and the nitrobenzene was separated. The water layer was shaken up several times with ether. The initial water layer was decolored with carbon, concentrated by evaporation to a small volume and Seignette salt was added to the solution until, upon ammoniation no further aluminum hydroxide precipitated, followed by ammoniation, the solution being shaken up several times with ether and the etheric solution was concentrated by evaporation in vacuo to remove the ammonia. Then the residue was dissolved in ether and hydrochloric acid gas was introduced. Red oil precipitated. The ether was removed by evaporation and acetone was added, whereupon a light yellow substance crystallized out. The hydrochloride of 2.4.6 - trimethoxy-ω-methylamino-acetophenone was purified by crystallisation from alcohol. The substance melts, after drying at 110° C., at 174.5 to 175° C. (while decomposing).

*Analysis.*—$C_{12}H_{18}O_4NCl(275.590)$: found Cl, 12.80; calculated Cl, 12.89.

Example XI

To a solution of 60 gms. of anhydrous aluminum chloride in 120 gms. of nitrobenzene were added 22 gms. of (0.2 mol) hydrochloride of methylamino-acetonitrile at a temperature below 30° C. and 34 gms. of (0.2 mol) 1.3.4-trimethoxy-benzene while stirring and cooling. Then, while stirring, hydrochloric acid was introduced for 6 hours. After that the green reaction mixture was poured into 1 litre water, the layer of nitrobenzene was separated (117 gms.), the water layer shaken up with ether and decolored with carbon, the solution then being concentrated by evaporation to a small volume. The next day, the crystallized substance was drawn and washed with alcohol and ether. The substance weighed 28.5 gms., melted at 242° to 243° C. and had a chlorine content of 12.86%. For the hydrochloride of 2.4.5-trimethoxy-ω-methylamino-acetophenone a chlorine content of 12.89% is calculated. After one crystallization from alcohol the melting point rose to 249.5° to 250° C. (while decomposing) and remained constant after further recrystallization.

*Analysis.*—$C_{12}H_{18}O_4NCl(275.590)$: found N, 4.98, 5.02; calculated.

Example XII

A solution of 10 gms. of 3.4-dimethoxy-ω-methylamino-acetophenone-hydrochloride in 30 ccs. of concentrated hydrochloric acid was warmed in a Carius tube for 3 hours at 160° C. Subsequently the reaction mixture was dissolved in water, the solution decolored with carbon, filtered and the filtrate concentrated, by evaporation, to a small volume. After hydrochloric acid gas was introduced and the precipitate, the hydrochloride of adrenalone, was drawn off. The yield was 7.5 gms., which is 84% of theoretical yield. The melting point of the substance was 247° to 249° C. (while decomposing).

*Analysis.* — $C_9H_{12}O_3NCl(217.477)$: found C, 49.63; found H, 5.59; calculated C, 49.68; calculated H, 5.53; found N, 6.51; calculated N, 6.44.

Example XIII

A solution of 10 gms. of 3.4-dimethoxy-ω-isopropylamino-acetophenone-hydrochloride in 30 ccs. concentrated hydrochloric acid was warmed for 24 hours at 120° C. Subsequently, the reaction mixture was dissolved in water, the solution was decolored with carbon, filtered and the filtrate evaporated dryness in vacuo. The residue was dissolved in acetone and the precipitate was drawn off, yielding 6.5 gms. of hydrochloride of 3.4-dioxy-ω-isopropylamino-acetophenone or 73% of theoretical yield.

*Analysis.* — $C_{11}H_{16}O_3NCl(245.489)$: found C, 53.58, 53.71; calculated C, 53.78; found H, 6.60, 6.56; calculated H, 6.52; found N, 5.43; found Cl, 14.03; calculated N, 5.71; calculated Cl, 14.45.

Example XIV

To a solution of 41 gms. of 3.4-dimethoxy-ω-methyl - amino - acetophenone - hydrochloride in 200 ccs. water was added a nickel catalyser made from 30 gms. of Raney nickel alloy and the reaction mixture was shaken with hydrogen under normal pressure, till no further hydrogen was absorbed. Then the catalyser was separated by filtering, the filtrate concentrated by evaporation in vacuo and the residue evaporated with a mixture of alcohol and benzol. The oil was dissolved in alcohol and this solution was diluted with ether. After some time, the hydrochloride of the dimethylether of adrenaline (36 gms.) crystallized. Purification is effected by crystallisation from alcohol and the result is a product having a melting point of 135° to 136° C. and a percentage of chlorine of 14.28%. For the hydrochloride of 1-(3.4-dimethoxyphenyl)-2-methyl-amino-ethanol-1 the calculated percentage of chlorine is 14.34. The free base was isolated by treating the salt with concentrated lye, dissolving the oil in ether, and evaporating the etheric solutions in vacuo. The residue is recrystallised from a mixture of alcohol and ethylacetate. The dimethylether of adrenaline melts at 103 to 105° C. Beilstein 13 (341) states a melting point of 104° C. of this substance.

Example XV

To a solution of 13.5 gms. of 3.4-dimethoxy-ω-isopropyl - amino - acetophenone - hydrochloride in 30 ccs. of water was added a solution of 225 mgs. of palladium chloride (PdCl₂) in a small quantity of water acidified with hydrochloric acid and 2.25 gms. of active carbon. The reaction mixture was shaken with hydrogen, at normal temperature and pressure, until the theoretical quantity of hydrogen was absorbed. Subsequently the catalyser was separated by filtering, the solution evaporated to dryness in vacuo, and the residue treated with acetone. The solid material was drawn off and washed with acetone and ether. The yield was 11.1 gms. of hydrochloride of 1-(3.4-dimethoxy-phenyl)-2-isopropylamino-ethanol-1, i. e., 83% of the theoretical value. The percentage of chlorine found was 12.90%, the calculated percentage of chlorine being 12.90%. Melting point was 182° to 183° C.

While we have thus described our invention with several examples and applications thereof other variants in the method and other experimental expedients will be obvious to those skilled in the art without departing from the spirit and scope of the invention as defined in the appended claims:

What we claim is:

1. A method of preparing an aminoketone which comprises reacting a first compound of the formula

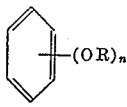

in which $n$ is an integer from 2 to 3 and R is selected from the group consisting of lower alkyls and benzyl, with a second compound having the formula

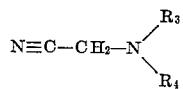

in which $R_3$ and $R_4$ are selected from the group consisting of hydrogen and lower alkyls, in the presence of aluminum chloride as a condensation catalyst in a liquid solvent selected from the group consisting of nitrobenzene, ortho-nitrotoluene and ortho-nitroanisol to produce an imide salt therefrom of the formula

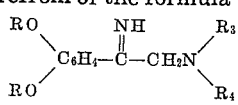

and converting the imide salt by the action of water to the corresponding aminoketone of the formula

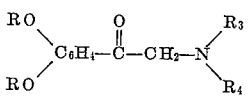

2. A method as claimed in claim 1 in which the solvent is nitrobenzene.

3. A method as claimed in claim 1, in which the hydrochloric acid salt of an aminonitrile

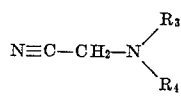

is employed.

4. A method as claimed in claim 1, in which the reaction is effected at a temperature of between about 0° and 70° C.

5. A method as claimed in claim 1, in which $n$ is 2 and R is methyl.

6. A process as claimed in claim 1, in which the second compound is methylamino-acetonitrile hydrochloride.

7. A method as claimed in claim 1 in which the second compound is N-isopropylamino-acetonitrile hydrochloride.

8. A method as claimed in claim 1 in which the second compound is amino-acetonitrile hydrochloride.

References Cited in the file of this patent

UNITED STATES PATENTS

| Number | Name | Date |
|---|---|---|
| 1,959,392 | Stolz et al. | May 22, 1934 |
| 2,083,001 | Bockmuhl et al. | June 8, 1937 |
| 2,308,232 | Scheuing et al. | Jan. 12, 1943 |

OTHER REFERENCES

Adams et al.: "Organic Reactions," vol. 5, Wiley and Sons, Inc., New York, N. Y., 1949, pp. 387–412, "The Hoesch Reaction."

Houben et al.: Berichte, vol. 60, pp. 1759–1778 (1927).